Sept. 23, 1924.
H. L. BOYER
1,509,414
PLATE HOLDER
Original Filed May 31, 1919
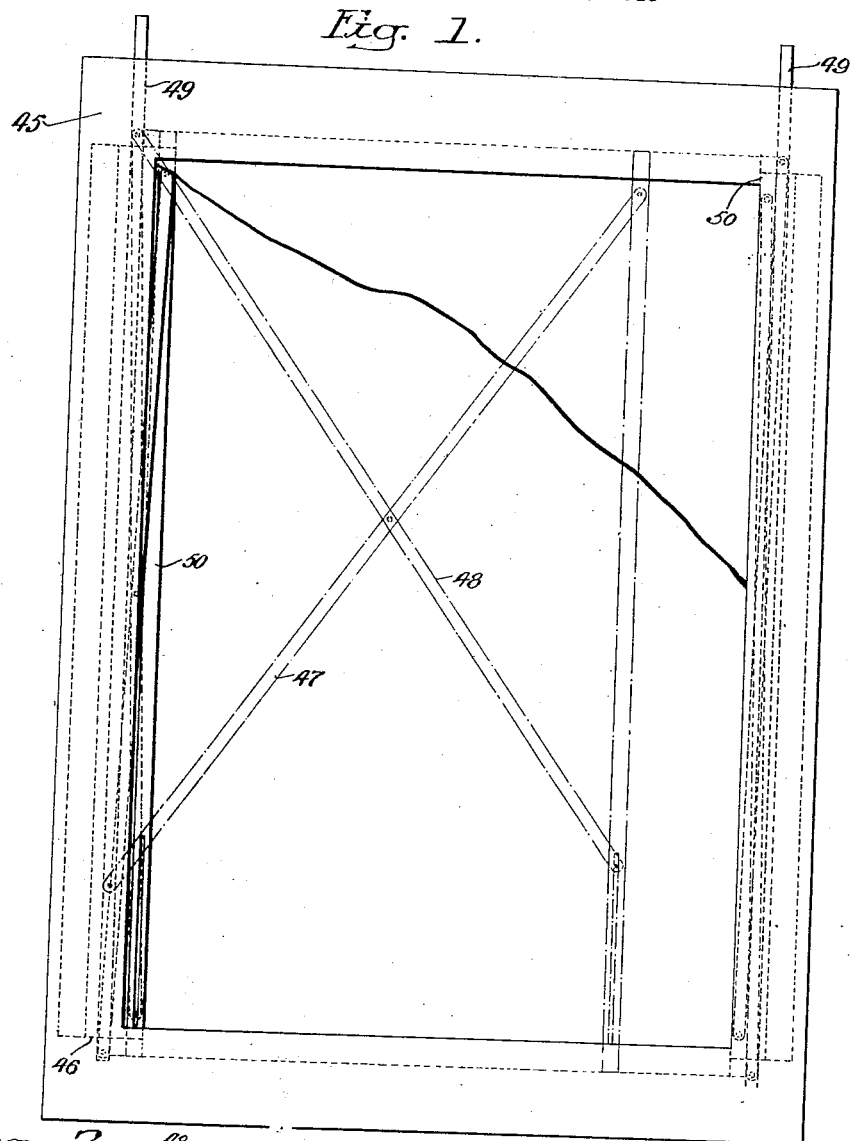
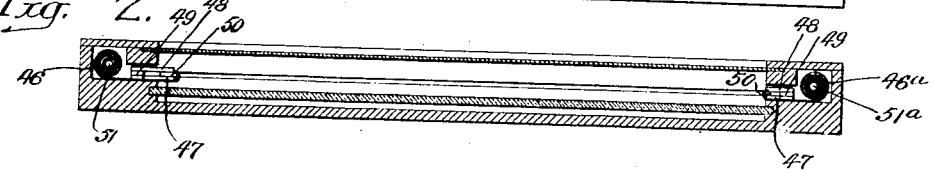
Inventor.
Harvey L. Boyer,
by his Attorneys,
Howson & Howson Patented Sept. 23, 1924.

1,509,414

UNITED STATES PATENT OFFICE.

HARVEY LEWIS BOYER, OF PHILADELPHIA, PENNSYLVANIA.

PLATE HOLDER.

Application filed May 31, 1919, Serial No. 300,979. Renewed February 25, 1924.

*To all whom it may concern:*

Be it known that I, HARVEY LEWIS BOYER, a citizen of the United States, residing in Philadelphia, Pennsylvania, have invented certain Improvements in Plate Holders, of which the following is a specification.

One object of my invention is to provide a novel form of plate holder whereby a title or other identifying matter may be displayed directly upon the film or plate at or about the time the picture is taken; that is to say, at the time the film or plate is exposed for the reception of a picture to be subsequently developed and printed.

Another object of my invention is to provide means whereby it is possible to protect at will an area of any desired size at any portion of a film or plate in order to permit of a title or other identifying matter being printed on the portion of said film or plate so protected.

Fig. 1, is a face view of a plate holder forming the subject of my invention, and Fig. 2, is a cross sectional view of the same.

In Figs. 1 and 2, I have shown a plate holder 45 provided with curtains 46 and 46ª arranged to cover portions of the sensitized surface of the plate or film 1 while the balance of the same is being exposed. This arrangement comprises operative means for the curtain in the shape of a pair of lazy-tongs or levers 47 and 48 for each curtain, suitably mounted with respect to the plate holder or other structure, which levers are pivotally connected to an operating rod 49 and to a rod 50 to which the edges of the curtains are respectively connected. Movement of the rod 49 will cause the lazy-tongs arrangement to spread or retract the curtain. The curtains are provided on two sides of the plate holder or camera so that either portion of the sensitized plate or film may be protected from exposure. The curtains are carried by spring rollers 51 and 51ª concealed by the side of the plate holder or by any suitable portion of the camera. In Fig. 1, the curtain operating means are shown partially open in full lines on one side, and still further open by dotted lines.

The above described device constitutes means for protecting a portion of the film normally exposed for the reception of a picture, in order that such protected portion may receive the title or other memoranda of the picture so taken, which is printed directly thereon by means such as are described and claimed in my U. S. Patent #1,305,585, dated June 3, 1919.

I claim:

1. The combination with a carrier for a sensitized element; of a roller; a curtain mounted on said roller and movable therefrom over the sensitized element; with means for actuating said curtain consisting of a lazy tongs attached thereto and a member for actuating said lazy tongs.

2. The combination with a carrier for a sensitized element having an exposure space for said element; of roller carried curtains mounted on opposite sides of said exposure space; means comprising lazy tongs for moving the curtains at will across the exposure space; and means for manually actuating said lazy tongs.

HARVEY LEWIS BOYER.